US008837435B2

(12) United States Patent
Singh et al.

(10) Patent No.: US 8,837,435 B2
(45) Date of Patent: Sep. 16, 2014

(54) METHOD AND SYSTEM FOR MEDIUM ACCESS CONTROL IN COMMUNICATION NETWORKS

(75) Inventors: Harkirat Singh, Santa Clara, CA (US); Huai-Rong Shao, San Jose, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 844 days.

(21) Appl. No.: 11/981,018

(22) Filed: Oct. 31, 2007

(65) Prior Publication Data

US 2009/0109938 A1 Apr. 30, 2009

(51) Int. Cl.
*H04B 7/212* (2006.01)
*H04W 4/00* (2009.01)
*H04L 12/403* (2006.01)
*H04L 12/413* (2006.01)
*H04W 74/08* (2009.01)

(52) U.S. Cl.
CPC ......... *H04W 74/0816* (2013.01); *H04L 12/413* (2013.01); *H04W 74/08* (2013.01); *H04L 12/4035* (2013.01)
USPC ........................... 370/335; 370/337; 370/338

(58) Field of Classification Search
CPC .. H04L 12/4035; H04L 12/413; H04W 74/08
USPC .......................................... 370/445, 462, 463
See application file for complete search history.

(56) References Cited

U.S. PATENT DOCUMENTS

| | | | |
|---|---|---|---|
| 5,574,938 A | 11/1996 | Bartow et al. | |
| 6,363,062 B1 | 3/2002 | Aaronson et al. | |
| 6,374,085 B1 | 4/2002 | Saints et al. | |
| 6,438,723 B1 | 8/2002 | Kalliojarvi | |
| 6,611,231 B2 | 8/2003 | Crilly, Jr. et al. | |
| 6,640,087 B2 | 10/2003 | Reed et al. | |
| 6,662,321 B1 | 12/2003 | Collin | |
| 6,813,260 B1 | 11/2004 | Fogle | |
| 6,947,409 B2 | 9/2005 | Iwamura | |
| 7,145,871 B2 | 12/2006 | Levy et al. | |
| 7,283,832 B2 | 10/2007 | Jia et al. | |
| 7,321,580 B1 | 1/2008 | Ramanathan et al. | |
| 7,433,648 B2 | 10/2008 | Bridgelall | |

(Continued)

OTHER PUBLICATIONS

Maruhashi, K.; Kishimoto, S.; Ito, M.; Ohata, K.; Hamada, Y.; Morimoto, T.; Shimawaki, H., "Wireless uncompressed-HDTV-signal transmission system utilizing compact 60-GHz-band transmitter and receiver", Microwave Symposium Digest, 2005 IEEE MTT-S International, Jun. 12-17, 2005, pp. 1867-1870.

(Continued)

*Primary Examiner* — Brandon Renner
(74) *Attorney, Agent, or Firm* — Kenneth L. Sherman, Esq.; Michael Zarrabian, Esq.; Sherman & Zarrabian LLP

(57) ABSTRACT

A method and a system for medium access control among devices in a communication system is provided. One implementation involves selecting a contention-based control period for access to a shared communication medium; dividing the contention-based control period into multiple time slots, wherein each slot has a duration that is a function of one or more of the duration of transmission of a request to send (RTS) frame, the duration of transmission of a clear to send (CTS) frame, and an inter frame space (IFS) duration therebetween; and transmitting an RTS frame in a selected slot for allocating a reservation period for accessing the medium for data transmission.

36 Claims, 20 Drawing Sheets

(56) References Cited

U.S. PATENT DOCUMENTS

| | | | |
|---|---|---|---|
| 7,508,834 B2 | 3/2009 | Berkman et al. | |
| 7,522,618 B2 | 4/2009 | Hamamoto et al. | |
| 7,558,249 B2 | 7/2009 | Hamamoto et al. | |
| 7,558,854 B2 | 7/2009 | Nakahara et al. | |
| 7,720,036 B2 | 5/2010 | Sadri et al. | |
| 7,804,842 B2 | 9/2010 | Malik et al. | |
| 7,822,440 B2 | 10/2010 | Park et al. | |
| 7,852,791 B2 | 12/2010 | Nakajima et al. | |
| 7,889,701 B2 | 2/2011 | Malik et al. | |
| 7,920,885 B2 | 4/2011 | Singh et al. | |
| 7,925,297 B2 | 4/2011 | Zhu et al. | |
| 7,945,680 B2 | 5/2011 | Logalbo et al. | |
| 7,990,997 B2 | 8/2011 | Wang et al. | |
| 8,005,003 B2 | 8/2011 | Miyazaki et al. | |
| 8,060,447 B2 | 11/2011 | Hamid et al. | |
| 8,145,182 B2 | 3/2012 | Rudolf et al. | |
| 8,175,043 B2 | 5/2012 | So | |
| 8,190,136 B2 | 5/2012 | Pucar Rimhagen et al. | |
| 8,416,720 B2 | 4/2013 | Hiben et al. | |
| 8,503,339 B2 | 8/2013 | Nakajima et al. | |
| 2002/0146023 A1 | 10/2002 | Myers | |
| 2003/0084162 A1 | 5/2003 | Johnson et al. | |
| 2003/0125932 A1 | 7/2003 | Wang et al. | |
| 2003/0227934 A1* | 12/2003 | White et al. | 370/432 |
| 2004/0047314 A1* | 3/2004 | Li | 370/335 |
| 2004/0258006 A1 | 12/2004 | An | |
| 2005/0013238 A1 | 1/2005 | Hansen | |
| 2005/0089002 A1 | 4/2005 | Shin et al. | |
| 2005/0141545 A1* | 6/2005 | Fein et al. | 370/445 |
| 2005/0147112 A1* | 7/2005 | Sugaya | 370/418 |
| 2005/0249121 A1 | 11/2005 | Matsunaga | |
| 2006/0013176 A1* | 1/2006 | De Vos et al. | 370/338 |
| 2006/0067283 A1 | 3/2006 | So et al. | |
| 2006/0114867 A1* | 6/2006 | Du et al. | 370/338 |
| 2006/0153105 A1 | 7/2006 | Jia et al. | |
| 2006/0159003 A1 | 7/2006 | Nanda et al. | |
| 2006/0168343 A1 | 7/2006 | Ma et al. | |
| 2006/0209772 A1 | 9/2006 | Fang et al. | |
| 2006/0209876 A1 | 9/2006 | Liu et al. | |
| 2006/0239293 A1* | 10/2006 | Vasil'evich et al. | 370/445 |
| 2007/0153916 A1 | 7/2007 | Demircin et al. | |
| 2007/0204205 A1 | 8/2007 | Niu et al. | |
| 2007/0223412 A1* | 9/2007 | Lott | 370/310.1 |
| 2007/0240191 A1 | 10/2007 | Singh et al. | |
| 2007/0258541 A1* | 11/2007 | Yamaura | 375/267 |
| 2008/0002636 A1* | 1/2008 | Gaur et al. | 370/338 |
| 2008/0080553 A1* | 4/2008 | Hasty et al. | 370/468 |
| 2008/0186895 A1 | 8/2008 | Shang et al. | |
| 2008/0273600 A1 | 11/2008 | Singh et al. | |
| 2008/0298310 A1 | 12/2008 | Hu | |
| 2009/0207769 A1 | 8/2009 | Park et al. | |
| 2009/0286116 A1 | 11/2009 | Matsumoto et al. | |
| 2010/0115090 A1 | 5/2010 | Petersen et al. | |
| 2010/0172296 A1 | 7/2010 | Singh et al. | |
| 2011/0009051 A1 | 1/2011 | Khedouri et al. | |
| 2011/0122853 A1 | 5/2011 | Hirano et al. | |
| 2011/0170511 A1 | 7/2011 | Chen | |
| 2012/0020257 A1 | 1/2012 | Urabe et al. | |
| 2012/0099576 A1 | 4/2012 | Li et al. | |
| 2012/0263137 A1 | 10/2012 | Walton et al. | |
| 2013/0021366 A9 | 1/2013 | Khedouri et al. | |
| 2013/0022185 A9 | 1/2013 | Khedouri et al. | |
| 2013/0142080 A1 | 6/2013 | So | |

OTHER PUBLICATIONS 802.15.3™ IEEE Standard for Information Technology-Telecommunications and information exchange between systems-Local and metropolitan area networks-Specific requirements, Part 15.3: Wireless Medium Access Control (MAC) and Physical Layer (PHY) Specifications for High Rate Wireless Personal Area Networks (WPANs), IEEE Std 802.15.3-2003, IEEE Computer Society, Sep. 29, 2003, 324 pages.

"Distributed Medium Access Control (MAC) for Wireless Networks," WiMedia Alliance, Draft 0.99, Nov. 1, 2005, 182 pages.

Hitachi, Ltd. et al., High-Definition Multimedia Interface (HDMI) Specification Version 1.2, Aug. 22, 2005, pp. 1-214.

IEEE 802.11, Part II: Wireless LAN Medium Access Control (MAC) and Physical Layer (PHY) Specifications, ANSI/IEEE Std. 802.11, 1999 Edition, 528 pages.

WirelessHD, LLC., "WirelessHD Specification, Revision 0.1," WirelessHD, LLC., Jul. 12, 2006, pp. i-167, United States.

Hachman, M. "CE Giants Back Amimon's Wireless HDTV Tech," www.pcmag.com, Jul. 23, 2008, p. 1, United States, downloaded from http://www.pcmag.com/article2/0,2817,2326277,00.asp on Feb. 2, 2011.

Physorg.Com, "NEC Develops Compact Millimeter-wave Transceiver for Uncompressed HDTV Signal Transmission," www.physorg.com, Apr. 5, 2005, pp. 1-2, United States, downloaded from www.physorg.com/ news3569.html on Sep. 29, 2006.

LG Electronics Inc. et al., "WirelessHD Specification Version 1.0 Overview," wirelesshd.org, Oct. 9, 2007, pp. 1-77, United States.

Villasenor-Gonzalez, L. et al., "HOLSR: A Hierarchical Proactive Routing Mechanism for Mobile Ad Hoc Networks," IEEE Communications Magazine, Jul. 2005, pp. 1-8, United States.

Ros, F. et al., "Cluster-based OLSR Extensions to Reduce Control Overhead in Mobile Ad Hoc Networks," International Wireless Communications and Mobile Computing Conference (IWCMC 2007), Aug. 12-16, 2007, pp. 1-6, Honolulu, United States.

Ramachandran, K.N. et al., "Interference-Aware Channel Assignment in Multi-Radio Wireless Mesh Networks," INFOCOM 2006 25th IEEE International Conference on Computer Communications, Apr. 2006, pp. 1-22, United States.

Perahia, E. et al., "Next Generation Wireless LANs: Throughput, Robustness, and Reliability in 802.11n," 2008, pp. 1-10, Cambridge University Press, Cambridge, United Kingdom.

U. Madhow, "MultiGigabit millimeter wave communication: System concepts and challenges," Information Theory and Applications Workshop 2008, Jan. 2008, pp. 1-4, United States.

IST Broadway, "A 5/60GHz Hybrid System Concept," IST BroadWay, 2008, pp. 1-12, United States.

802.11 Working Group of the 802 Committee, "IEEE P802.11nTM/D3.00 Draft Standard for Information Technology—Telecommunications and Information Exchange Between Systems—Local and Metropolitan Area Networks-Specific Requirements—Part 11: Wireless LAN Medium Access Control (MAC) and Physical Layer (PHY) Specifications: Amendment 4: Enhancements for Higher Throughput," IEEE, Sep. 2007, pp. 1 -544, United States.

Choi, S. et al., "IEEE 802.11e Contention-Based Channel Access (EDCF) Performance Evaluation," IEEE International Conference on Communications, 2003, vol. 2, IEEE, pp. 1-6, United States.

Iannone, L. et al., "Can Multi-Rate Radios Reduce End-to-End Delay in Mesh Networks? A Simulation Case Study," MESH Networking: Realizing the Wireless Internet (Meshnets'05), Jul. 2005, pp. 1-10, Budapest, Hungary.

Heinzelman, W.R. et al., "Energy-Efficient Communication Protocol for Wireless Microsensor Networks," Proceedings of the 33rd Hawaii International Conference on System Sciences, Jan. 2000, pp. 1-10, Hawaii, United States.

Draves, R. et al., "Routing in Multi-Radio, Multi-Hop Wireless Mesh Networks," MobiCom '04, Sep. 26, 2004 to Oct. 1, 2004, pp. 1-15, Philadelphia, United States.

Courville, M. et al., "Evaluation of Centralized Adhoc Network Architecture (CANA)," BAI Cluster Workshop 2004-03, IST BroadWay Project, Jun. 1, 2004, pp. 1-17, United States.

IEEE Computer Society, "802.11 IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications—(Revision of IEEE Std 802.11-1999)," IEEE, Jun. 12, 2007, pp. i-1184, United States [Part 1—pp. i-251].

IEEE Computer Society, "802.11 IEEE Standard for Information Technology—Telecommunications and Information Exchange Between Systems—Local and Metropolitan Area Networks—Specific Requirements Part 11: Wireless LAN Medium Access Control

(56) References Cited

OTHER PUBLICATIONS (MAC) and Physical Layer (PHY) Specifications—(Revision of IEEE Std 802.11-1999)," IEEE, Jun. 12, 2007, pp. i-1184, United States [Part 2—pp. 252-551].

IEEE Computer Society, "802.11 IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications—(Revision of IEEE Std 802.11-1999)," IEEE, Jun. 12, 2007, pp. i-1184, United States [Part 3—pp. 552-950].

IEEE Computer Society, "802.11 IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications—(Revision of IEEE Std 802.11-1999)," IEEE, Jun. 12, 2007, pp. i-1184, United States [Part 4—pp. 951-1184].

U.S. Non-Final Office Action for U.S. Appl. No. 11/743,013 mailed Jan. 29, 2013.
U.S. Final Office Action for U.S. Appl. No. 12/626,527 mailed Feb. 6, 2013.
U.S. Non-Final Office Action for U.S. Appl. No. 12/626,527 mailed Aug. 27, 2012.
U.S. Final Office Action for U.S. Appl. No. 11/743,013 mailed Dec. 21, 2011.
U.S. Non-Final Office Action for U.S. Appl. No. 11/743,013 mailed Nov. 2, 2012.
U.S. Non-final Office Action for U.S. Appl. No. 11/743,013 mailed Sep. 13, 2011.
U.S. Final Office Action for U.S. Appl. No. 11/743,013 mailed May 13, 2013.
U.S. Non-Final Office Action for U.S. Appl. No. 12/626,527 mailed Aug. 26, 2013.
U.S. Notice of Allowance for U.S. Appl. No. 12/626,527 mailed Mar. 17, 2014.

* cited by examiner

RTS

50

CTS

55

Modified RTS Bits:

60

Modified
CTS
Bits:   4

65

110

METHOD AND SYSTEM FOR MEDIUM ACCESS CONTROL IN COMMUNICATION NETWORKS

FIELD OF THE INVENTION

The present invention relates generally to communication networks and in particular, to medium access control in communication networks.

BACKGROUND OF THE INVENTION

The Medium Access Control (MAC) data communication protocol layer provides addressing and channel access control mechanisms for several network nodes to communicate within a multipoint network. Such a network can be a local area network (LAN) as in a wired or wireless network. For a wireless network, the MAC layer manages and maintains communications between wireless communication stations by coordinating access to a shared wireless (e.g., radio frequency) channel utilizing MAC protocols for communications over the wireless channel.

In a contention-based MAC protocol without channel sensing, all stations contend for the access to a shared channel, wherein a packet transmission is successful when only one station attempts to transmit the packet. When multiple nodes attempt transmitting packets over the shared channel simultaneously, packet collisions occur.

In a Pure Aloha MAC protocol for packet radio networks, a station transmits a packet over the channel whenever a new packet arrives into the transmission queue of that station. Packet collision occurs if more than one station transmits at the same time, resulting in a retransmission of the packet at some time in the future, independent of other stations. As a result, the communication system throughput of a network using a Pure Aloha MAC protocol is about 18%.

FIG. 1 shows a variation of the Pure Aloha MAC protocol, know as a Slotted Aloha protocol. In the example protocol 1 shown in FIG. 1, time is divided into slots 2, and each slot 2 comprises a fixed period of time defined to be the duration required to transmit a packet 3. Stations are forced to start transmission of packets only at slot boundaries. Therefore, vulnerability to packet collisions (i.e., the vulnerability period) is reduced to the duration of one slot. A packet transmission is successful if and only if, exactly one packet is scheduled in a slot. In comparison to a Pure Aloha protocol, the vulnerability period is reduced by half, thus, doubling the throughput of a Slotted Aloha relative to a Pure Aloha. As such, the system throughput of a Slotted Aloha protocol is 36%.

However, the Slotted Aloha MAC protocol has several disadvantages. Each slot should be long enough to accommodate the largest size packet. If packets are of variable length, then unused slot durations lead to channel bandwidth waste or lower channel utilization. Even if a packet is transmitted successfully, the transmitting station (the sender) has no information about the success of the transmission. Thus, an explicit acknowledgement (ACK) is required from a receiving station (the receiver) in a different time slot. This further consumes channel bandwidth. Further, upon receiving the ACK, the transmitting station must acknowledge such receipt to the receiving station, further consuming channel bandwidth. In addition, the latency from the instant a data packet is transmitted from a transmitting station to the instant following receipt of a corresponding ACK from a receiving station can be quite large. Such a large latency is a disadvantage for transmission of delay sensitive packets.

FIG. 2 shows a Modified Slotted Aloha protocol 5, wherein the size of a slot 6 is increased (compared to slot 2 in FIG. 1 for the Slotted Aloha), so that an ACK 7 is transmitted within the same slot 6 as the data packet 8. The size of each slot 6 is large enough for transmission of the largest size data packet, an ACK 7, and an Inter-Frame Space (IFS) duration 9 for channel switching and other overhead. Transmitting the ACK 7 from the receiving station in the same slot as the transmission of the corresponding packet 8 from the transmitting station allows prompt invocation of retransmissions, if necessary. However, there remains channel waste due to variable length packet size. This is because any unused slot cannot be utilized for transmitting other packets, and because packet transmission is scheduled at the start of a slot boundary.

BRIEF SUMMARY OF THE INVENTION

The present invention provides a method and a system for medium access control among devices in a communication system. One embodiment involves selecting a contention-based control period for access to a shared communication medium; dividing the contention-based control period into multiple time slots, wherein each slot has a duration that is a function of one or more of the duration of transmission of a request to send (RTS) frame, the duration of transmission of a clear to send (CTS) frame, and an inter frame space (IFS) duration therebetween; and transmitting an RTS frame in a selected slot for allocating a reservation period for accessing the medium for data transmission.

In one implementation, the RTS frame includes a duration field indicating the number of slots desired for the reservation period. A reservation period is allocated by receiving the RTS frame, and transmitting a CTS frame in response during said selected slot to indicate successful allocation of the reservation period for accessing the medium. The CTS frame includes a duration field indicating the number of slots in the reservation period. Upon successfully receiving the CTS frame, transmission of data via the medium during the reservation period is initiated.

These and other features, aspects and advantages of the present invention will become understood with reference to the following description, appended claims and accompanying figures.

BRIEF DESCRIPTION OF THE DRAWINGS

In the drawings, like references refer to similar elements.

DETAILED DESCRIPTION OF THE INVENTION

The present invention provides a method and a system for media access control in communication systems. One embodiment provides a RTS/CTS Slotted Aloha MAC protocol (RCSA protocol) for controlling access to a shared channel for a contention-based control period. The RCSA protocol according to the present invention, does not require channel sensing for channel access, simplifying transmitter/receiver (transceiver) implementation and reducing hardware costs.

The RCSA protocol can be used with both omni-directional and directional modes of wireless station antennas. An implementation of such an RCSA protocol is described below in conjunction with a wireless network for communication of video information such as high definition (HD) video. An example of an RCSA protocol for a 60 GHz frequency band wireless network is provided which is useful with WirelessHD (WiHD) applications. WirelessHD is an industry-led effort to define a wireless digital network interface specification for wireless HD digital signal transmission on the 60 GHz frequency band, e.g., for consumer electronics (CE) and other electronic products. An example WiHD network utilizes a 60 GHz-band mmWave (millimeter-wave) technology to support a physical (PHY) layer data transmission rate of multi-Gbps (gigabits per second), and can be used for transmitting uncompressed high definition television (HDTV) signals wirelessly. The wireless devices can have multiple antennas, wherein directional beams are formed for transmitting/receiving HD video information using orthogonal frequency division multiplexing (OFDM). The present invention is useful with other wireless communication systems as well.

A video frame is divided into multiple scan lines, each scan line including an integer number of pixels, wherein each pixel comprises multiple components (e.g., color, luminance). In one example, pixel components include either a color component (chrominance) or a luminance component of the video. Quantization for pixel depth, or bits per component (bitplane), may be 8-bit, 10-bit, 12-bit or 16-bit values. Considering an 8-bit quantization, one 1080p scan line includes 46,080 bits. And, considering 60 frames/second, one second of uncompressed video (1080p) comprises 60×3×8×1920×1080=2.98 Gbits.

Figure 1:
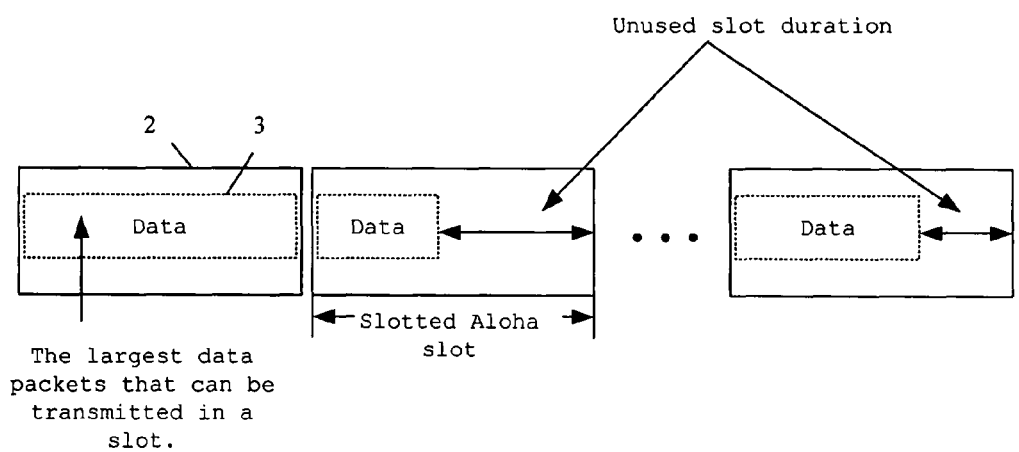
FIG. 1 shows a conventional Slotted Aloha channel access protocol.
Figure 2:
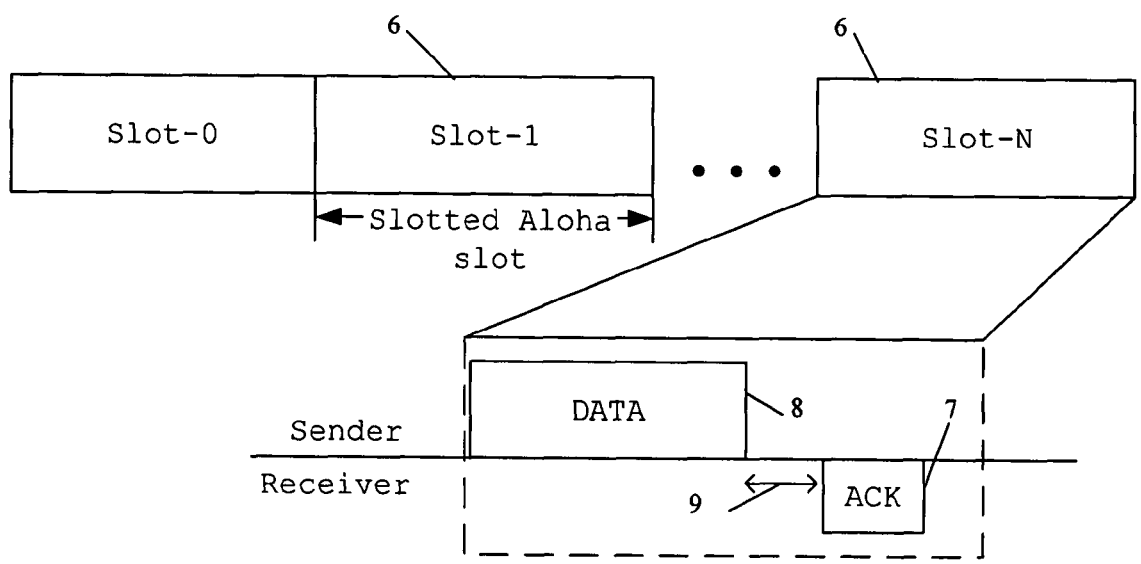
FIG. 2 shows a conventional modified Slotted Aloha channel access protocol.
Figure 3:
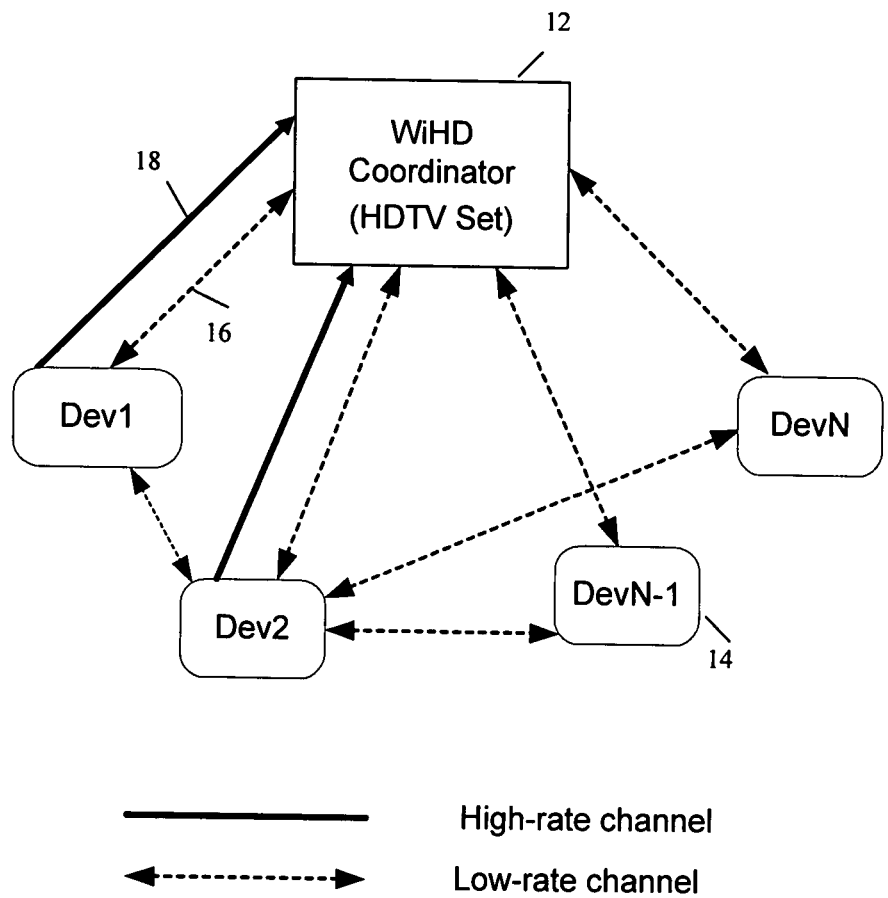
FIG. 3 shows a functional block diagram of an example wireless network that implements channel access control for wireless devices, according to the present invention.

FIG. 3 shows a functional block diagram of a wireless network 10 that implements uncompressed HD video transmission between WiHD devices such as a WiHD coordinator 12 and WiHD stations 14 (e.g., Dev1, ..., DevN), according to an embodiment of the present invention. The WiHD stations 14 utilize a low-rate wireless channel 16, and may use a high-rate channel 18, for communication therebetween. The WiHD coordinator 12 uses a low-rate channel 16 and a high-rate wireless channel 18, for communication with the stations 14. Each station 14 uses the low-rate channel 16 for communications with other stations 14. The high-rate channel 18 only supports single direction unicast transmission over directional beams established by beamforming, with, e.g., multi-Gb/s bandwidth to support uncompressed HD video transmission. The low-rate channel 16 can support bi-directional transmission, e.g., with at most 40 Mbps (megabits per second) throughput. The low-rate channel 16 is mainly used to transmit control frames such as ACK frames.

In this example, the WiHD coordinator 12 is a sink of video information (hereinafter "receiver 12"), and a WiHD station 14 is a sender of the video information (hereinafter "sender 14"). For example, the receiver 12 can be a sink of video and/or audio data (e.g., an HDTV set in a wireless network environment). The sender 14 can be a source of uncompressed video or audio. Examples of the sender include a set-top box, a DVD player, etc. In another example, the coordinator 12 can be a source of a video stream. In yet another example, the coordinator provides channel coordination functions for wireless communication between a sink station and a source station. The coordinator functions can also be implemented in a stand-alone device, in a sink device and/or in a source device.

Figures 4A, 4B:
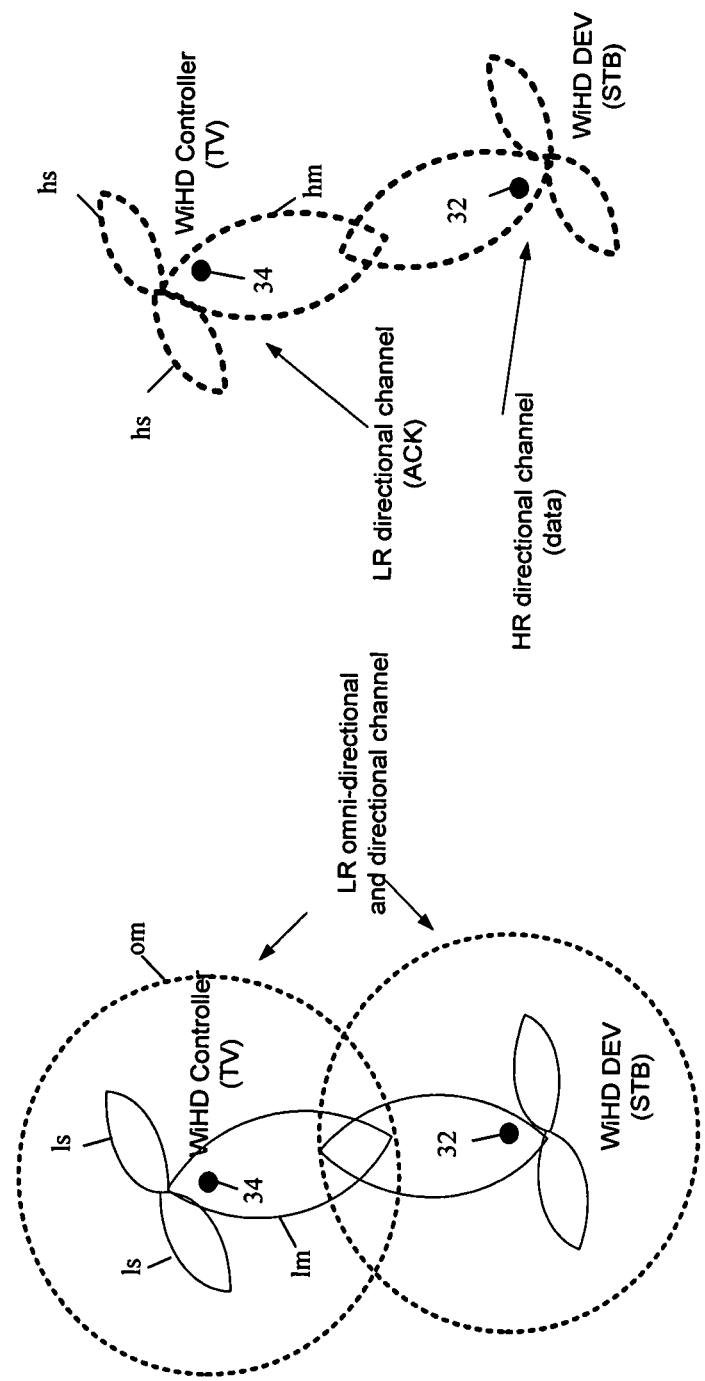
FIG. 4A shows an example network of wireless stations/devices implementing a channel access control protocol, according to the present invention.
FIG. 4B shows an example of directional beams for transmission of information in the system of FIG. 4A.

FIG. 4A shows an implementation of the network 10 as a WiHD network 30 of multiple WiHD devices 32 and 34. Each WiHD device utilizes two channels: a symmetric low-rate (LR) control channel and an asymmetric high-rate (HR) data channel. The LR channel operates in two modes: an omni-directional mode, which is used for the transmission of control data such as beacon, association/disassociation, device discovery, ACK, etc., wherein the omni-directional mode supports data rates of about 2.5~10 Mbps; and a directional or beamformed mode, which is used for transmitting audio streams, wherein the beamformed mode supports data rates of about 20~40 Mbps.

The asymmetric HR data channel is a directional (beamformed) channel which is used for the transmission of uncompressed video from the WiHD sender 32 to the WiHD receiver 34. An example scenario in FIG. 4A, involves the WiHD sender 32 (e.g., a set-top box (STB)), transmitting uncompressed video to the WiHD receiver 34 (e.g., HDTV), over a HR channel. The HR channel supports data rates of multi-Gbps (e.g., about 3~4 Gbps). In this scenario, the LR channel is used to send ACKs from the WiHD receiver 34 to the WiHD sender 32. A packet transmission duration on the HR channel can be from 100 μs (microseconds) to 200 μs. FIG. 4A further shows an omni-directional transmission om, main lobes lm, and side lobes ls, for the LR channel. FIG. 4B shows directional beams, comprising main lobes hm and side lobes hs, for the HR channel.

The network 30 is a type of personal area network (PAN). The device 34 acts as the coordinator (such as the coordinator 12 in FIG. 3) which is responsible for managing contention free (CF) and contention-based (CB) periods or superframes, for channel access by the devices 34 (such as the stations 14 in FIG. 3). The coordinator periodically transmits an omni-directional beacon to disseminate various timing information such as contention-based (CB) control periods, contention free (CF) data periods, time synchronization, etc., to the devices in the network. In this implementation, the RCSA protocol according to the present invention is applied in the contention-based control period which uses the LR channel, without relying on channel sensing for channel access. The RCSA protocol can be used with both omni-directional and directional modes of the LR channel.

Figure 5:
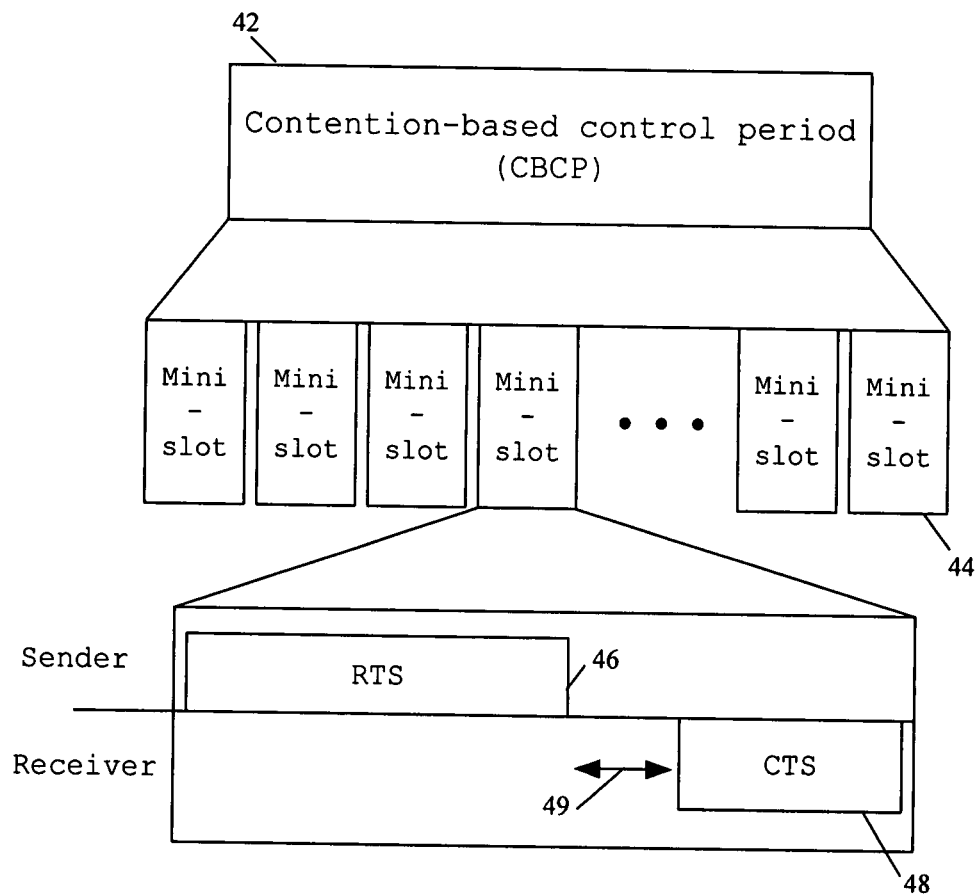
FIG. 5 shows an example of channel access control protocol during a contention-based control period, according to the present invention.

FIG. 5 shows a diagrammatical example of the RCSA protocol 40 according to the present invention, wherein a contention-based control period (CBCP) 42 is divided into multiple time periods shown as mini-slots 44. Each mini-slot time period 44 is long enough for transmission of a request to send frame (RTS) 46, for transmission of a clear to send frame (CTS) 48, and an inter frame space (IFS) duration 49 for channel turnaround time therebetween. The RTS and CTS are used for channel reservation, such as when a sender desires to transmit a data packet to a receiver over a wireless channel. The RTS 46 is transmitted by a sender (transmitter) device, the CTS 48 is transmitted by a receiver device, and the IFS duration is the time period in between the RTS and the CTS as shown in FIG. 5.

During the entire CBCP 42, the sender and the receiver devices remain awake. During a mini-slot 44, a sender transmits an RTS 46 with the MAC address of a particular receiver. When a particular receiver receives an RTS 46 that has the MAC address of the receiver, that receiver then replies with a CTS 48 during the same mini-slot 44 as transmission of the RTS 46, as shown by example in FIG. 5.

Figure 6A:
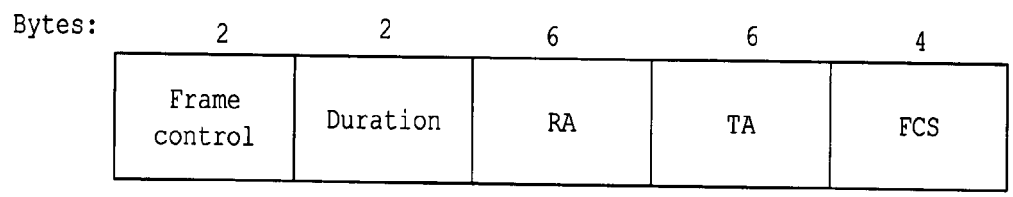
FIG. 6A shows the format of a conventional request to send (RTS).
Figure 6B:
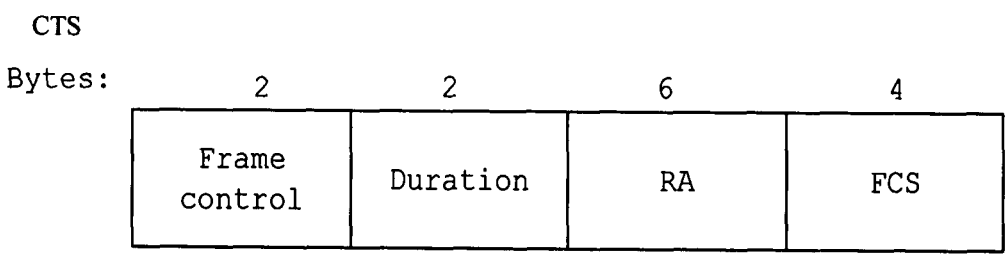
FIG. 6B shows the format of a conventional clear to send (CTS).
Figure 7A:
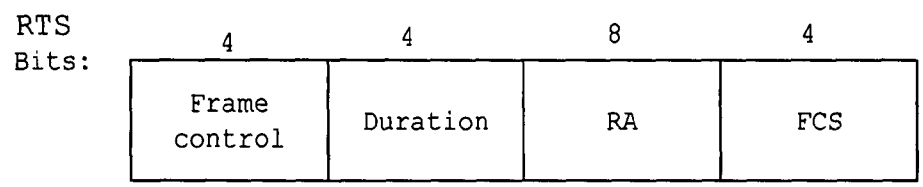
FIG. 7A shows the format of an RTS, according to an embodiment of the present invention.

In many wireless communication systems, a frame structure is used for data transmission between a transmitter and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information. According to the IEEE 802.11b specification (IEEE 802.11, Part II: Wireless LAN Medium Access Control (MAC) and Physical Layer (PHY) Specification, ANSI/IEEE std. 802.11 edition, 1999), the typical size of an RTS is 20 bytes, and the typical size of a CTS is 14 bytes. FIG. 6A shows the format of an RTS frame 50 according to the IEEE 802.11b specification, and FIG. 6B shows the format of a CTS frame 55 according to the IEEE 802.11b specification. For a WiHD PAN according to an embodiment of the present invention, such RTS and CTS formats 50, 55, are modified. FIG. 7A shows an RTS frame 60, and FIG. 7B shows a CTS frame 65, according to an embodiment of the present invention.

Compared to the conventional RTS 50 and the CTS 55, in the modified RTS 60 and CTS 65 (modified formats) the following changes are made. Instead of using a 6-byte transmitter address (TA) and a 6-byte receiver address (RA) fields, a 1-byte RA field is used in the modified formats. The frame control field which indicates the type of the frame is reduced to 4-bits in the modified formats. Since the modified RTS 60 is shorter than the conventional RTS 50, instead of using 4-bytes for a frame check sequence (FCS) field, a 4-bit CRC field is used for the FCS field of the modified RTS 60. The conventional TA address field is removed from the modified RTS 60. The conventional RA and TA addresses are removed from the modified CTS 65 because the CTS 65 is always transmitted in response to the RTS, which dispenses with the need for RA and TA addresses. Further, no CRC field is included in the CTS frame 65.

The duration field in the modified RTS 60 and CTS 65 frames represents the number of mini-slots the sender is trying to reserve using an RTS/CTS exchange. The value of the duration field in the RTS 60 and CTS 65 is the number of mini-slots a sender is requesting to reserve (i.e., the reservation period). This reservation period is used for transmitting a data packet including any ACKs. The base time unit of the duration field is N mini-slots. For example if the value of the duration field in the RTS 65 is "0011", the actual number of mini-slots being reserved is 3*N mini-slots. The RTS sender compares the duration field in the CTS 65 with the duration field in the RTS 60, and if the two duration fields match, then the sender assumes that the correct CTS 65 is received, otherwise not.

Figure 7B:
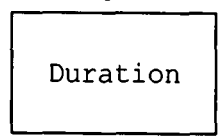
FIG. 7B shows the format of a CTS, according to an embodiment of the present invention.

Referring back to FIG. 5, the RTS 46 in the example of FIG. 5 can be of the format of the modified RTS frame 60 in FIG. 7A, and the CTS 48 can be of the format of the modified CTS frame 65 in FIG. 7B. Each mini-slot 44 is long enough for the duration of transmission of a RTS/CTS pair, plus an IFS duration for channel turnaround time.

Each device (communication station) in the network maintains a network allocation vector (NAV) timer which is used for virtual carrier sensing. A device updates its NAV timer based on the duration field of a received CTS 65. A device will not start a RTS/CTS exchange if its NAV timer has a value which is greater than the current time, indicating that the channel is reserved by some other device.

FIGS. 8A-D show flowcharts of the steps of an example channel access control protocol for channel reservation, according to the present invention. A sender device wishing to transmit a data packet randomly chooses a number B, with uniform distribution between 1 and the current backoff window (CurrBW), as a back of period of B mini-slots. The coordinator device adjusts the CurrBW value based on factors such as the number of stations in the WiHD PAN (Personal Area Network) and the number of RTS packets generated in a superframe. Therefore, the CurrBW value depends on the current load (i.e., the number of inactive devices in the network), as measured by the coordinator. The coordinator broadcasts the CurrBW value in a beacon. Because all devices in the WiHD network use the same CurrBW value, there is no fairness issue.

Figure 8A:
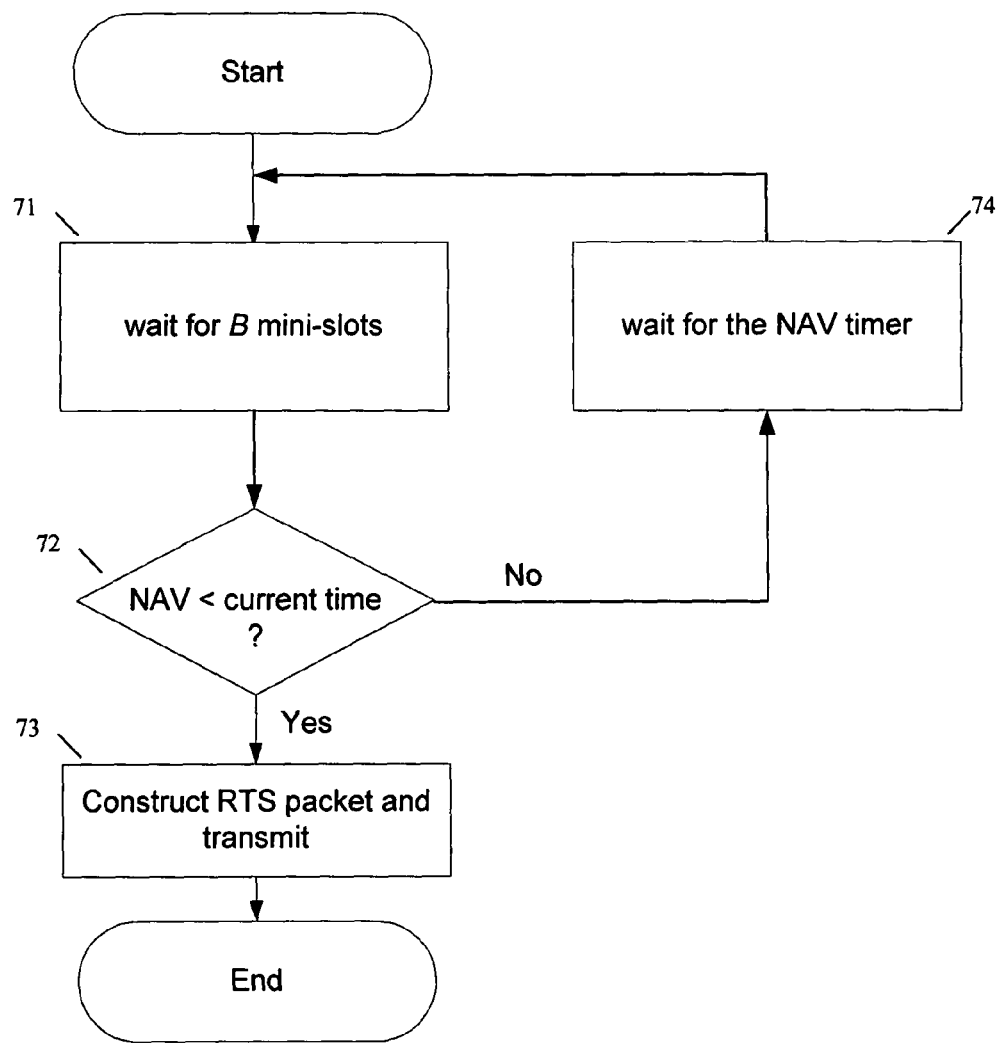
FIGS. 8A-D show flowcharts of the steps of an example channel access control protocol, according to the present invention.

FIG. 8A shows the steps for a sender reserving channel period by transmitting an RTS. Referring to the flowchart 70 in FIG. 8A, after randomly choosing a number B for back off mini-slots, the sender backs off or defers for B mini-slots (step 71). At the end of the deferred period, the sender checks if its NAV timer is less than the current time (step 72), if so, the sender transmits an RTS 60 in a mini-slot 44 (step 73). The sender then waits for a CTS 65 from a receiver during the same mini-slot 44. The sender backsoff if it does not receive a CTS 65 in response to the RTS 60, which can happen if two senders initiate RTS transmission in the same mini-slot 44.

After deferring for B mini-slots, if the sender determines that its NAV timer is greater than the current time, indicating that the channel is busy, then the sender defers for a number of mini-slots 44, which is the difference between the NAV timer and the current time (step 74). Thereafter, if the NAV timer is less than the current time, the sender backs off for a selected number of mini-slots 44 between 1 and CurrBW (as explained above) before sending another RTS. The sender attempts a number of retries (e.g., maxRTSTries) before discarding the data packet. The number of retries is implementation dependent.

Figure 8B:
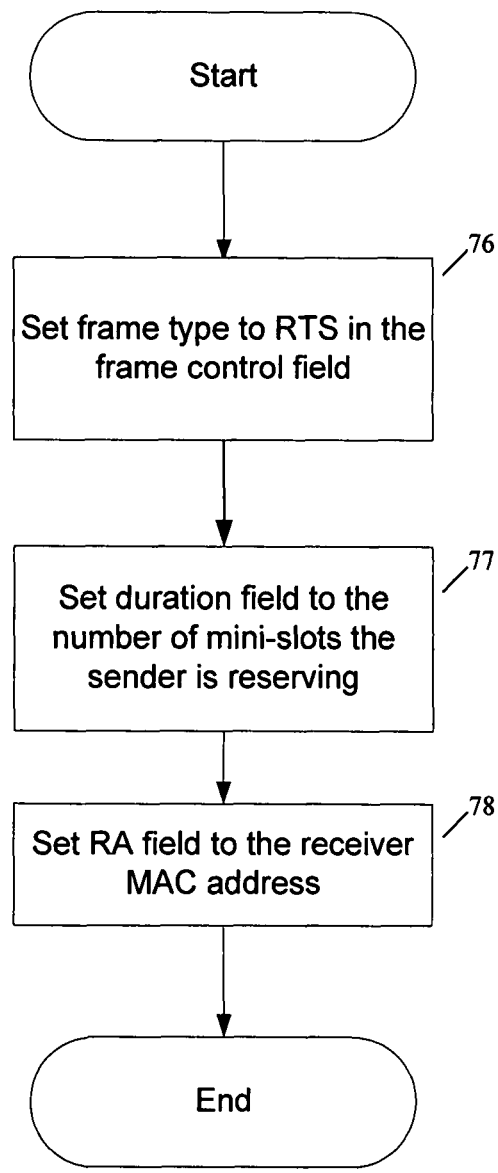

The flowchart 75 in FIG. 8B shows the steps for RTS packet formation, including: set the frame type to RTS in the frame control field (step 76), set the duration field to the number of mini-slots the sender is reserving (step 77), and set the RA field to the receiver MAC address (step 78).

Figure 8C:
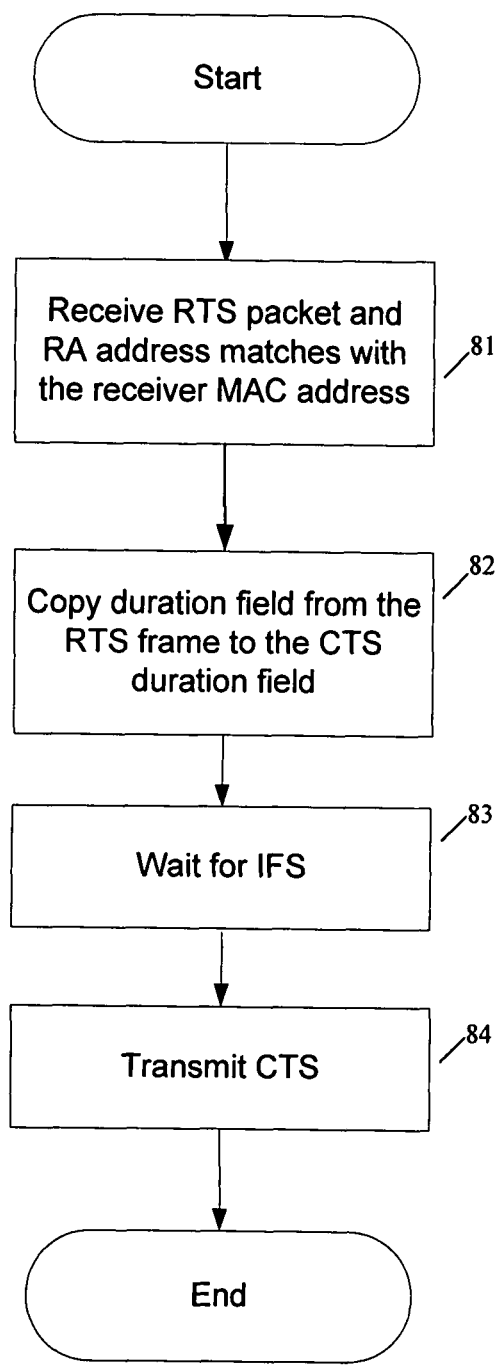

The flowchart 80 in FIG. 8C shows the steps for CTS frame construction and transmission at the receiver, including: in the received RTS frame the RA address matches with the MAC address of the receiver (step 81), copy the duration field from the RTS frame to the duration field of the CTS frame (step 82), wait for an IFS period (step 83), and transmit the CTS frame from the receiver to the sender (step 84).

Figure 8D:
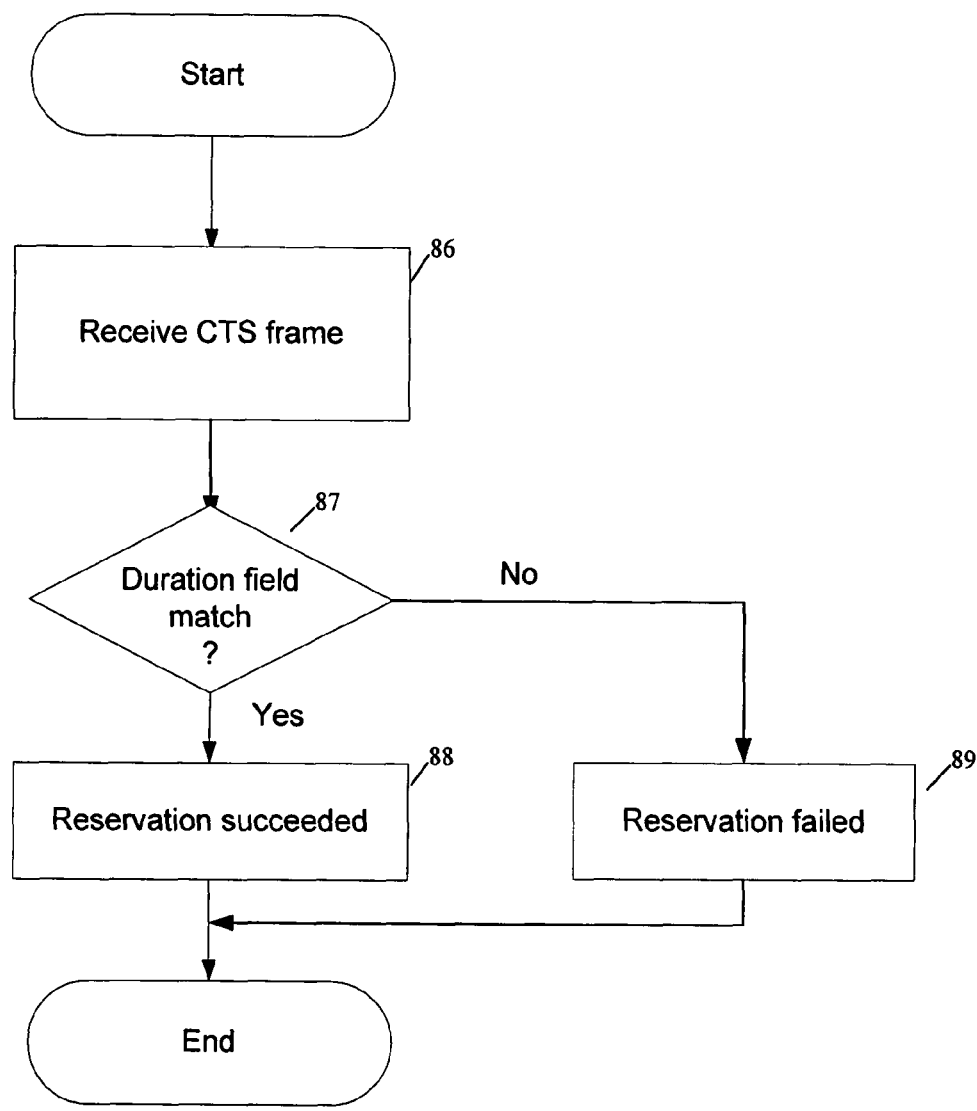

The flowchart 85 in FIG. 8D shows the steps for receiving the CTS frame at the sender upon transmitting the RTS frame, including: receive a CTS frame (step 86), determine if the duration field of the CTS matches the duration field of the RTS (step 87), if yes, channel reservation has succeeded (step 88), otherwise reservation has failed (step 89).

Figure 9:
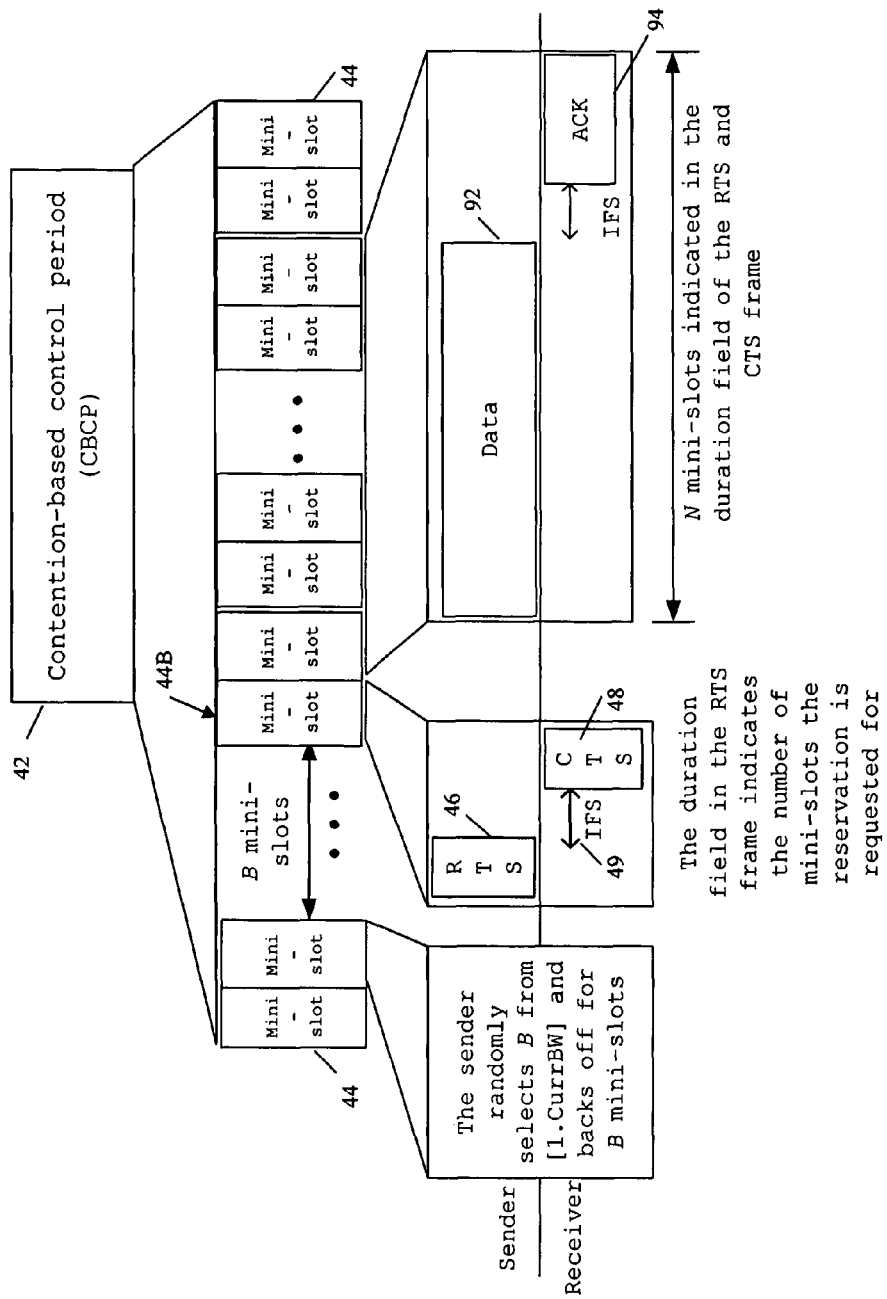
FIG. 9 shows an example operation of a channel access control protocol, according to the present invention.

FIG. 9 illustrates an example RCSA protocol 90 for exchanging RTS and CTS frames between a sender and a receiver for channel reservation, followed by data transmission from the sender to the receiver during reserved periods, according to the present invention. The protocol 90 is a further extension of the protocol 40 (FIG. 5) above. According to the protocol 90, each mini-slot 44 is long enough for transmission of an RTS 46 (such as RTS 60 in FIG. 7A), transmission of a CTS 48 (such as CTS 65 in FIG. 7B), and an IFS duration 49 for channel turnaround time therebetween. As shown in FIG. 9, the sender, wishing to transmit a data packet 92, selects a number B, randomly and uniformly distributed between 1 to CurrBW (i.e., the current backoff period), and defers for B mini-slots 44. Thereafter, the sender determines that its NAV timer is less than the current time, and the sender sends an RTS 46 in the B+1$^{th}$ mini-slot 44B. The sender then waits for a CTS 48. During the time mini-slot 44B, the receiver transmits a CTS 48 to the sender after an IFS duration 49. The sender checks that the duration field in the CTS 48 matches with the duration field in the RTS 46, wherein a match indicates that the sender has successfully reserved N mini-slots for transmission of the data packet 92. The sender then transmits the data packet 92 during the reserved mini-slots, and the receiver optionally replies with an ACK 94. Other examples are possible.

The duration field can also be utilized to handle a hidden terminal problem (the hidden terminal problem is described in the IEEE 802.11b protocol). Any device receiving an RTS and CTS pair in a mini-slot for which it is not the sender or receiver, updates its NAV timer to the duration field of the received RTS and CTS. Due to hidden terminal problems or for other reasons, a few devices may update their NAV timers based on an RTS received in a mini-slot without properly receiving the pairing CTS. This can lead to potential channel waste because although the sender of the RTS cannot transmit its data packet as it did not receive a paring CTS, other devices assume that the channel is busy and refrain from accessing the channel while the channel idles.

Figure 10:
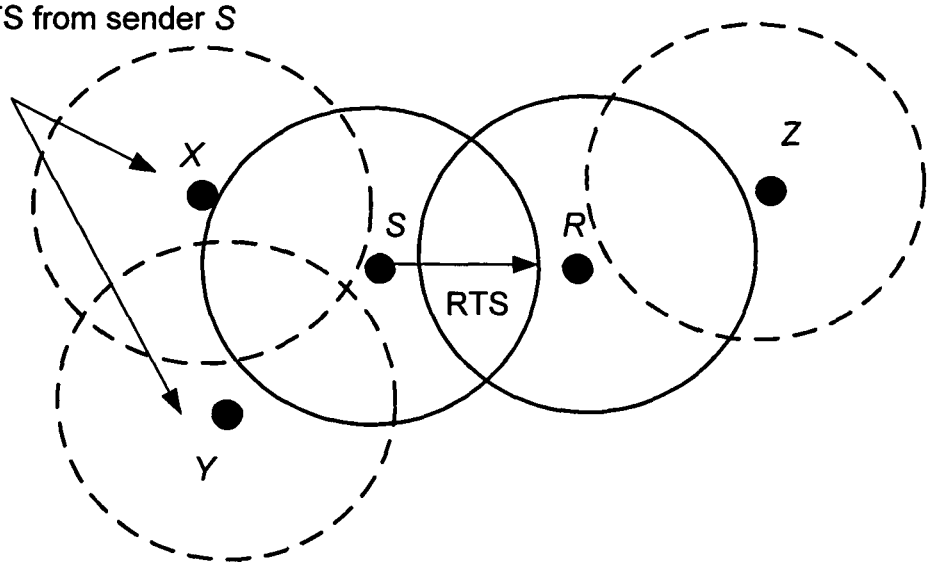
FIG. 10 shows an example, wherein a transmitter (sender) device transmits an RTS to a receiver device and waits for a CTS from the receiver device, but does not receive a CTS from the receiver device.

This is diagrammatically shown in the example network 100 in FIG. 10, wherein a sender device S transmits an RTS to a receiver device R, and waits for a CTS from the receiver device R. However, the sender device S does not receive a CTS from the receiver device R. In the meantime, the devices X and Y that received the RTS from the sender device S and did not receive a pairing CTS, set their NAV timer based on the duration field of the RTS from the sender device S. Thus, devices X and Y cannot access the channel until their NAV timers becomes obsolete. The channel idles for one data packet duration. A device Z is also shown which is out of range of the sender device S, and does not receive the RTS from the sender device S. In order to address this problem according to an embodiment of the present invention, when a sender device (e.g., the sender S in FIG. 10) transmits a first RTS in a mini-slot but does not receive a pairing CTS in that mini-slot, that sender device transmits a second RTS with a probability p in a subsequent mini-slot with the duration field of the second RTS set to zero, to clear the NAV timer of devices such as devices X and Y, set by the first RTS frame. Similar to the CurrBW, the value p is indicated by the coordinator.

In another implementation, an optimized CTS includes a special PHY preamble so that upon receiving that preamble the sender knows that it is a RTS reply (i.e., CTS). This further reduces the CTS size, wherein transmitting said preamble indicates successful receipt of an RTS. The length of the special PHY preamble is the same as the PHY preamble used for the RTS. However, the CTS does not include any MAC or PHY payload. Using such an optimized CTS, the mini-slot duration can be selected based on the time required to transmit the RTS/CTS pair.

Figure 11:
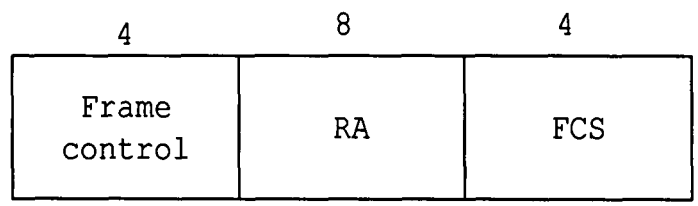
FIG. 11 shows an RTS format, according to an embodiment of the present invention.

Further, assuming an RTS/CTS exchange reserves a fixed number of mini-slots for a sender (i.e., a fixed length reservation), the duration field in the RTS can be eliminated in an optimized RTS 110 as shown in FIG. 11. In this case, using the optimized CTS (with the modified PHY preamble) above, the mini-slot duration can be selected based on the time required to transmit the RTS/CTS pair, wherein:

The time required to transmit RTS/CTS pair=(RTS PHY preamble duration+RTS size in bits/PHY transmission rate in Mbps)+(CTS PHY preamble duration)+IFS.

Figure 12:
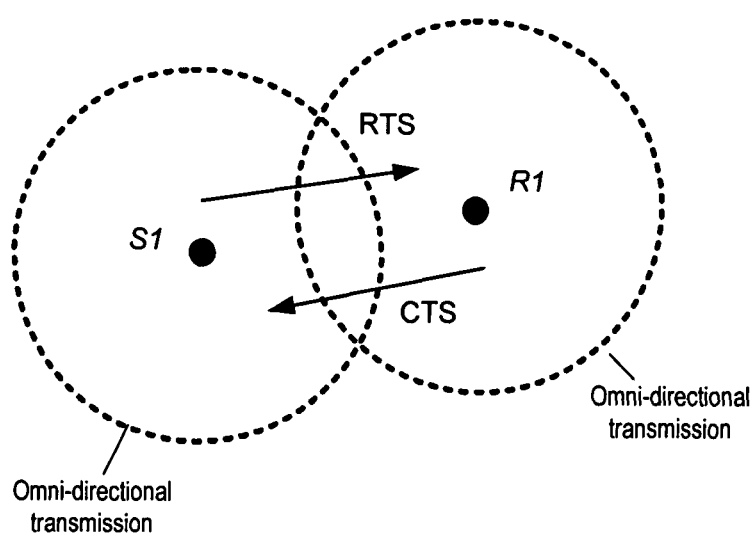
FIG. 12 shows an example of omni-directional exchange of RTS and CTS, according to the present invention.
Figure 13:
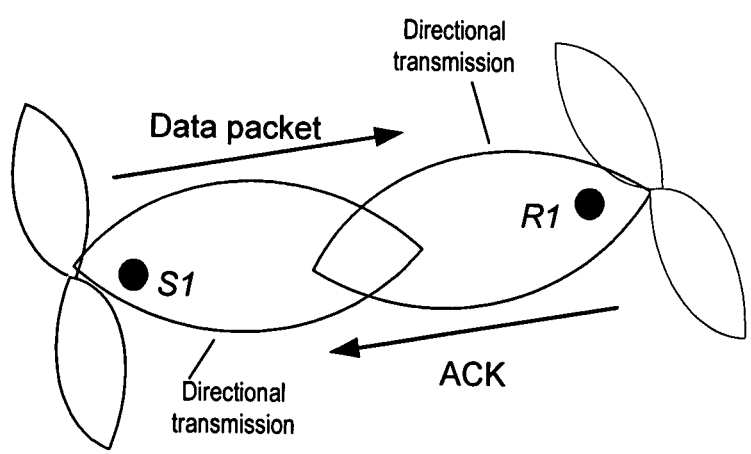
FIG. 13 shows an example of directional transmission of data and ACK, according to the present invention.

In another implementation, when both the LR and HR channels use a similar type of PHY layer technology (e.g., OFDM), the LR channel can use the HR rate steering vectors for beamforming or directional transmissions. In that case, a separate beamtracking for the LR channel becomes unnecessary. Referring to the examples in FIGS. 12 and 13, after reserving the channel using an RTS/CTS exchange according to the RCSA protocol, the sender and receiver can optionally transmit a data packet and ACK directionally. Since directional data transmission provides a higher signal-to-interference-and-noise-ratio (SINR), the directional data packet has a higher probability of successful transmission. In the example of FIG. 12, following an omni-directional RTS/CTS exchange between a sender S1 and a receiver R1, the sender S1 reserves a few mini-slots. Then as shown by example in FIG. 13, after reserving the channel, the sender S1 transmits a directional data packet which the receiver replies with a directional ACK.

Figure 14:
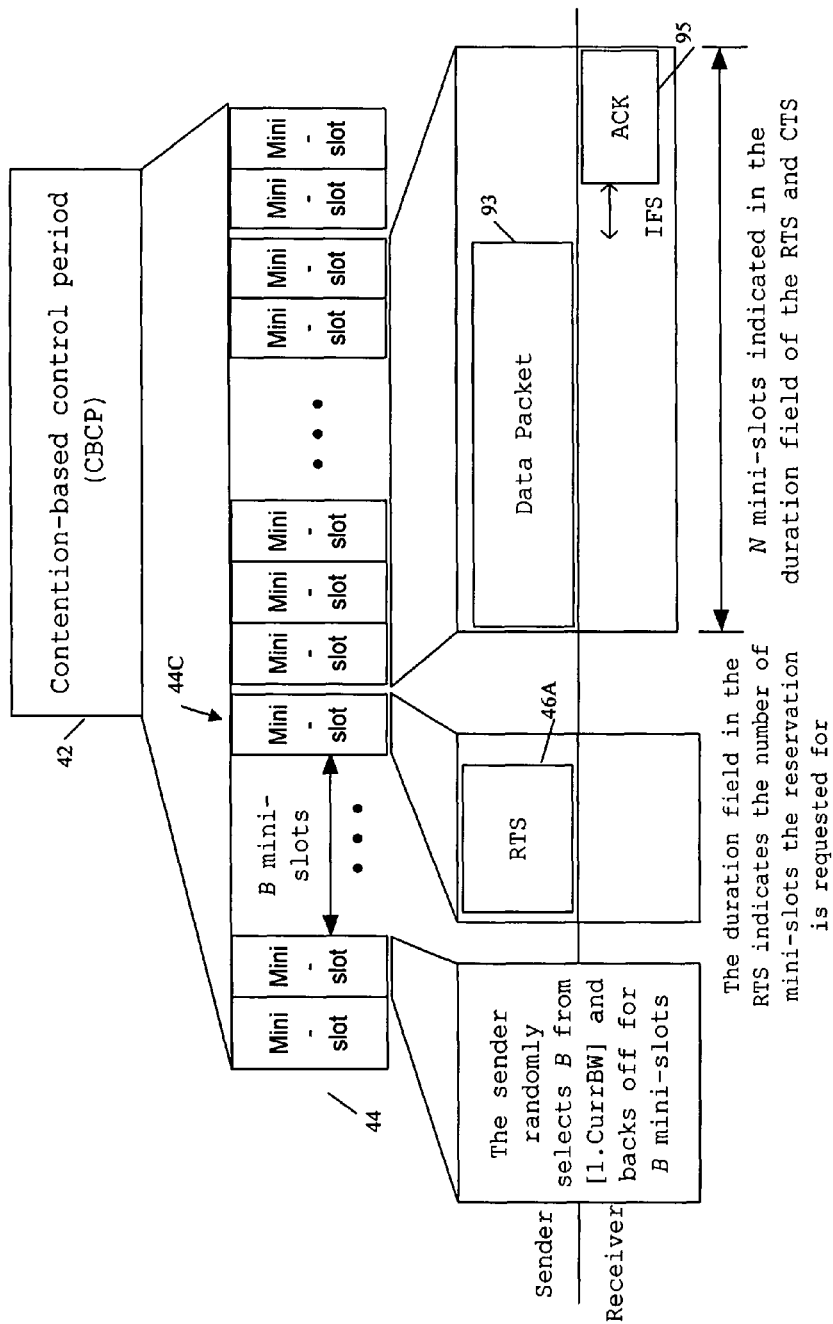
FIG. 14 shows another example of channel access control protocol, according to the present invention.

Referring to FIG. 14, another example RCSA protocol 120, according to the present invention involves the sender transmitting an RTS in a mini-slot, but the receiver not replying with a CTS. The sender starts data transmission in the next mini-slot after transmitting the RTS. Specifically, the sender selects a number B, randomly and uniformly distributed between 1 to CurrBW, and defers for B mini-slots 44. Thereafter, when the NAV timer of the sender is less than the current time, the sender sends a RTS 46A in the B+1$^{th}$ mini-slot 44C. Because the NAV indicates that the channel is free, transmitting an RTS suffices to reserve the shared channel. The sender then transmits a data packet 93 during the reserved mini-slots and the receiver replies with an ACK 95. The ACK 95 is mandatory because it is possible that the RTS 46A collides with some other frames transmitted over the channel. However, the sender continues transmission of the data packet 93 without knowing if the RTS 46A was successfully received. The ACK 95 from the receiver informs the sender that the data packet 93 was successfully received at the receiver. The duration of the mini-slot for this embodiment of the RCSA protocol can be determined as based on the time required to transmit a RTS, wherein:

The time required to transmit an RTS=PHY preamble duration+RTS size in bits/PHY transmission rate in Mbps.

For a fixed length reservation scheme in the RCSA protocol 90, the mini-slot duration is the same as the time required to transmit an RTS, as described above.

An RCSA protocol according to the present invention allows higher channel utilization, accommodates variable length packets, reduces delay for transmitting time sensitive packets, reduces hardware costs since transceivers do not require supporting channel sensing, and supports both omnidirectional and directional transmission modes.

Figure 15:
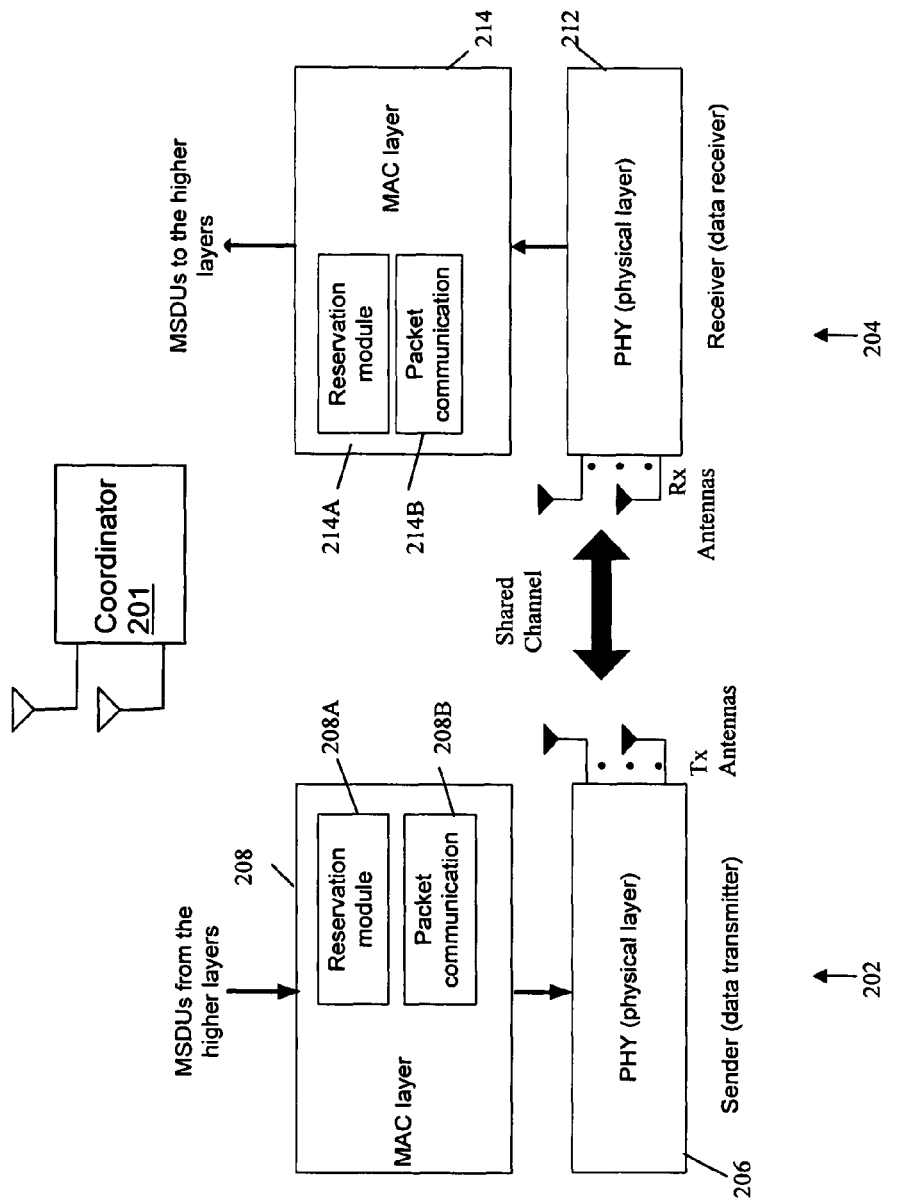
FIG. 15 shows a functional block diagram of an example wireless network that implements channel access control for wireless devices, according to the present invention.

FIG. 15 shows a functional block diagram of an example wireless system 200 implementing the medium access control scheme in a wireless network, according to an embodiment of the present invention. The system 200 includes wireless stations 201, 202 and 204. In one communication scenario, the station 202 can function as a sender, the station 204 can function as a wireless receiver, and the station 201 can function as a coordinator as described above.

The sender 202 includes a PHY layer 206 and a MAC layer 208. The MAC layer 208 implements a reservation module 208A and a packet communication module 208B.

The receiver 204 includes a PHY layer 212 and a MAC layer 214. The MAC layer 214 implements a reservation module 214A and a packet communication module 214B. The PHY layers 206, 212, may implement functions as the PHY layer in the IEEE 802.11 standard. Each PHY layer 206, 212, may comprise one or multiple antennas.

The MAC layers 208, 214 together implement an RCSA protocol, according to the present invention as described hereinabove. The MAC layers 208, 214 comprise several modules, however, in FIG. 15, only the modules 208A-B and 214A-B are shown. Specifically, the example reservation module 208A of the sender implements steps including those in FIGS. 8A, 8B and 8D, while the reservation module 214A of the receiver implements steps including those in FIG. 8C, as described above. After channel reservation, the sender packet communication module 208B implements a packet transmission process and the receiver packet communication module 214B implements a packet receiving process, as described above.

Although the above examples of the present invention have been described in conjunction with wireless networks, the present invention is useful with other networks, such as wired networks, as those skilled in the art will recognize.

Further, as is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for medium access control among devices in a communication system, comprising:
    selecting a contention-based control period for access to a shared communication medium;
    dividing the contention-based control period into multiple time slots, wherein each slot has a duration that is long enough for: the duration of transmission of a request to send (RTS) frame, the duration of transmission of a clear to send (CTS) frame, and an inter frame space (IFS) duration therebetween, during that time slot;
    transmitting an RTS frame in a selected slot for allocating a reservation period for accessing the shared communication medium for data transmission; and
    determining when to send a CTS frame in response to the RTS frame based on duration of the reservation period.

2. The method of claim 1, wherein the medium comprises a shared 60 GHz wireless channel and the data comprises video information.

3. The method of claim 1, wherein allocating a reservation period further includes adjusting the current backoff window value and broadcasting it over the medium in a beacon for the devices to use the same backoff window value, wherein the current backoff window is a function of the number of inactive devices in the network.

4. The method of claim 1, wherein allocating a reservation period further includes:
    randomly choosing a number with a uniform distribution between 1 and a current backoff window, as a number of backoff slots before transmitting data, wherein each slot has a duration based on the time required to transmit an RTS frame;
    backing off for the number of backoff slots;
    when the medium is not busy, transmitting an RTS frame;
    transmitting a data packet over the medium in a slot subsequent to transmission of the RTS frame; and
    transmitting an acknowledgment for the data to indicate a successful reception of the data.

5. The method of claim 1, wherein transmitter address (TA) addresses are removed from the CTS frame, and the CTS frame is always transmitted in response to the RTS frame.

6. The method of claim 1, wherein receiver address (RA) addresses are removed from the CTS frame, and the CTS frame is always transmitted in response to the RTS frame.

7. The method of claim 1, wherein the data transmission comprises wireless uncompressed High Definition (HD) video data transmission.

8. The method of claim 1, wherein a cyclic redundancy check (CRC) field is used for a frame check sequence (FCS) field of the RTS frame.

9. The method of claim 1, wherein the RTS frame includes a duration field indicating a number of slots desired for the reservation period, the method further comprising allocating the reservation period by receiving the RTS frame, and transmitting a CTS frame in response during said selected slot to indicate successful allocation of the reservation period for accessing the shared communication medium.

10. The method of claim 1, wherein transmitting an RTS comprises:
    updating a timer based on duration of a desired reservation period;
    if the timer is greater than a current time, backing off for a difference between the timer and the current time, before transmitting the RTS.

11. The method of claim 1, wherein:
selecting a number of backoff slots comprises randomly choosing a number with a uniform distribution between 1 and a current backoff window, as a number of backoff slots.

12. The method of claim 1, wherein each slot is long enough for duration of transmission of a RTS, a response CTS and IFS, during a same slot.

13. The method of claim 1, further comprising
selecting a number of backoff slots based on a current backoff window; and
if a timer is less than the current time, backing off for said backoff slots, before sending another RTS frame.

14. The method of claim 13, wherein allocating a reservation period further includes:
determining if the timer is greater than the current time, and if so, then backing off for the difference between the timer and the current time; and
thereafter, determining if the timer is less than the current time, and if so, backing off for a selected number of slots between 1 and the current backoff window, before sending another RTS with a duration field with a value zero, in another slot to release the medium.

15. The method of claim 13, wherein determining if the timer is less than the current time further comprises backing off for said backoff slots, before sending said another RTS frame with a duration field with a value zero, in another slot to reserve the medium, wherein the RTS frame includes a duration field indicating the number of slots desired for the reservation period.

16. The method of claim 15 further including allocating a reservation period by receiving the RTS frame, and transmitting a CTS frame in response during said selected slot to indicate successful allocation of the reservation period for accessing the medium.

17. The method of claim 16, wherein the CTS frame includes a duration field indicating the number of slots in the reservation period, the method further including upon successfully receiving the CTS frame, comparing the duration field in the CTS with the duration field in the RTS, and if the two duration fields match, then assuming a successful reservation of the medium and initiating transmission of data via the medium during the reservation period.

18. The method of claim 16, further including updating the timer based on the duration field, and determining if the medium is busy by checking if the timer has a value which is greater than the current time, wherein allocating a reservation period further includes before transmitting the RTS frame, randomly choosing a number with a uniform distribution between 1 and a current backoff window, as a number of backoff slots before transmission of the RTS.

19. The method of claim 18, wherein allocating a reservation period further includes:
before transmitting the RTS, backing off for said number of backoff slots; and
checking if the timer is less than the current time, and if so, transmitting the RTS during the selected slot.

20. The method of claim 16, wherein the CTS frame includes a preamble indicating it is in response to the RTS, and the CTS frame does not include a MAC and PHY payload, the method further comprising directionally transmitting a data packet and an acknowledgment packet over a shared wireless communication medium, wherein the RTS and CTS transmissions comprise omni-directional transmissions over a shared wireless communication medium.

21. A transmitter for information communication over a shared communication medium, comprising:
a reservation module that comprises a processor for allocating a reservation period for accessing the medium for data transmission, and transmitting a request to send (RTS) frame in a selected time slot of a contention-based control period that is divided into multiple time slots, wherein each slot has a duration that is long enough for: the duration of transmission of an RTS frame, the duration of transmission of a clear to send (CTS) frame, and an inter frame space (IFS) duration therebetween, during that time slot, wherein transmission of an RTS frame is based on a current back-off window, and the current back-off window comprises a function of a number of inactive devices in a network, and a coordinator adjusts a current backoff window value and broadcasts it over the medium in a beacon, wherein a cyclic redundancy check (CRC) field is used as a frame check sequence (FCS) field of the RTS frame.

22. The transmitter of claim 21, wherein the RTS frame includes a duration field indicating the number of slots desired for the reservation period, and the reservation module further uses the processor for awaiting receipt of a CTS frame in response to the RTS frame for reserving the medium, the transmitter further including a packet communication module that uses the processor for initiating transmission of data via the medium during the reservation period.

23. The transmitter of claim 22, wherein the reservation module further uses the processor for updating a timer based on the duration field, and for determining if the medium is busy by checking if the timer has a value which is greater than the current time, such that before transmitting the RTS frame, the reservation module uses the processor for randomly choosing a number with a uniform distribution between 1 and a current backoff window, as the particular number of backoff slots before transmission of the RTS.

24. The transmitter of claim 23, wherein before transmitting the RTS, the transmitter backs off for said particular number of back-off slots, and checks if the timer is less than the current time, and if so, transmits the RTS during the selected slot.

25. The transmitter of claim 24, wherein before transmitting the RTS, the transmitter backs off for said number of back-off slots, and thereafter, determines if the timer is greater than the current time, and if so, then backs off for the difference between the timer and the current time, and thereafter, determines if the timer is less than the current time, and if so backs off for a selected number of slots between 1 and the current backoff window, before sending another RTS with a duration field with a value zero, in another slot to reserve the medium.

26. The transmitter of claim 22, wherein upon successfully receiving the CTS, the reservation module uses the processor for comparing the duration field in the CTS with the duration field in the RTS, and if the two duration fields match, then assumes a successful reservation of the medium.

27. The transmitter of claim 21, wherein the medium comprises a shared 60 GHz wireless channel and the data comprises video information.

28. The transmitter of claim 21, wherein the CTS frame includes a preamble indicating it is in response to the RTS and the CTS frame does not include a MAC and PHY payload.

29. The transmitter of claim 22 further including a communication module that uses the processor for directionally transmitting information over the medium during the reservation period over a shared wireless communication medium, and the RTS and CTS transmissions comprise omni-directional transmissions over a shared wireless communication medium.

30. The transmitter of claim 21, wherein:
each slot has a duration based on the time required to transmit an RTS frame;
the reservation module further uses the processor for:
randomly choosing a number with a uniform distribution between 1 and a current backoff window, as the particular number of backoff slots before transmitting data;
backing off for the particular number of backoff slots; and
when the medium is not busy, transmitting an RTS frame;
the transmitter further including a packet communication module that uses the transmitter for transmitting a data packet over the medium in a slot subsequent to transmission of the RTS frame.

31. A receiver for information communication over a shared communication medium, comprising:
a reservation module that comprises a processor for receiving a reduced size request to send (RTS) frame during a selected time slot of a contention-based control period and for allocating a reservation period by transmitting a clear to send (CTS) frame in response during said selected slot, to indicate successful allocation of the reservation period for accessing the medium, wherein the reduced size RTS frame has a frame check sequence (FCS) field removed;
wherein the contention-based control period is divided into multiple time slots, wherein each slot has a duration that is a function of one or more of: the duration of transmission of an RTS frame, the duration of transmission of a CTS frame, and an inter frame space (IFS) duration therebetween, wherein before transmitting the RTS frame, the reservation module further using the processor for randomly choosing a number with a uniform distribution between 1 and a current backoff window, as a number of backoff slots, for determining if a timer is greater than current time, and if so, then backing off for the difference between the timer and the current time, and thereafter, for determining if the timer is less than the current time, and if so backing off for said backoff slots, before sending another RTS frame with a duration field with a value zero, in another slot to reserve the medium.

32. The receiver of claim 31, wherein the RTS frame includes a duration field indicating the number of slots desired for the reservation period, and the CTS frame includes a duration field indicating the number of slots in the reservation period.

33. The receiver of claim 32, wherein the CTS includes a preamble indicating it is in response to the RTS and the CTS frame does not include a MAC and PHY payload.

34. The receiver of claim 33, wherein the medium comprises a shared 60 GHz wireless channel and the data comprises video information.

35. A method for medium access control among devices in a communication system, comprising:
selecting a contention-based control period for access to a shared communication medium;
dividing the contention-based control period into multiple time slots, wherein each slot has a duration that is a function of one or more of: the duration of transmission of a request to send (RTS) frame, the duration of transmission of a clear to send (CTS) frame, and an inter frame space (IFS) duration therebetween;
transmitting an RTS frame in a selected slot for allocating a reservation period for accessing the medium for data transmission; and
allocating a reservation period by receiving the RTS frame, and transmitting a CTS frame in response during said selected slot to indicate successful allocation of the reservation period for accessing the medium, wherein allocating a reservation period further includes:
checking if a timer is less than current time, and if so, transmitting the RTS frame during the selected slot;
determining if the timer is greater than the current time, and if so, then backing off for the difference between the timer and the current time; and
thereafter, determining if the timer is less than the current time, and if so, backing off for a selected number of slots between 1 and a current backoff window, before sending another RTS frame with a duration field with a value zero, in another slot to release the medium.

36. A transmitter for information communication over a shared communication medium, comprising:
a reservation module that comprises a processor for allocating a reservation period for accessing the medium for data transmission, by transmitting a request to send (RTS) frame in a selected time slot of a contention-based control period that is divided into multiple time slots, wherein each slot has a duration that is a function of one or more of: the duration of transmission of an RTS frame, the duration of transmission of a clear to send (CTS) frame, and an inter frame space (IFS) duration therebetween, wherein transmission of an RTS frame is based on a current back-off window, and the current back-off window comprises a function of a number of inactive devices in a network, and a coordinator adjusts a current backoff window value and broadcasts it over the medium in a beacon, wherein before transmitting the RTS, the transmitter backs off for said number of back-off slots, and thereafter, determines if the timer is greater than the current time, and if so, then backs off for the difference between the timer and the current time, and thereafter, determines if the timer is less than the current time, and if so backs off for a selected number of slots between 1 and the current backoff window, before sending another RTS flame with a duration field with a value zero, in another slot to reserve the medium.

* * * * *